(12) United States Patent
Adachi

(10) Patent No.: US 11,267,140 B2
(45) Date of Patent: Mar. 8, 2022

(54) ROBOT AND LINEAR-SHAPED-ITEM TREATING STRUCTURE THEREOF

(71) Applicant: FANUC CORPORATION, Yamanashi (JP)

(72) Inventor: Satoshi Adachi, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 97 days.

(21) Appl. No.: 16/222,238

(22) Filed: Dec. 17, 2018

(65) Prior Publication Data

US 2019/0193285 A1    Jun. 27, 2019

(30) Foreign Application Priority Data

Dec. 25, 2017 (JP) .............................. JP2017248088

(51) Int. Cl.
    *B25J 17/02*      (2006.01)
    *B25J 19/00*      (2006.01)

(52) U.S. Cl.
     CPC ........... *B25J 17/02* (2013.01); *B25J 19/0025* (2013.01)

(58) Field of Classification Search
     CPC ........ B25J 17/02; B25J 19/00; B25J 19/0025; B25J 19/0029
     See application file for complete search history.

(56) References Cited

U.S. PATENT DOCUMENTS

| | | | | |
|---|---|---|---|---|
| 4,969,795 A * | 11/1990 | Toyoda | ................ | B25J 19/0025 |
| | | | | 414/744.2 |
| 6,125,715 A * | 10/2000 | Nissfolk | .............. | B25J 17/0258 |
| | | | | 74/490.02 |
| 6,250,174 B1 | 6/2001 | Terada et al. | | |
| 6,468,096 B1 | 10/2002 | Nagatsuka | | |
| 7,419,351 B2 * | 9/2008 | Nihei | ................... | B25J 19/0025 |
| | | | | 414/735 |
| 8,720,295 B2 * | 5/2014 | Long | .................... | B25J 19/0029 |
| | | | | 74/490.02 |
| 9,242,382 B2 * | 1/2016 | Mori | .................... | B25J 17/0258 |
| 9,770,831 B2 * | 9/2017 | Sakai | ................... | B25J 19/0025 |
| 2003/0192390 A1 | 10/2003 | Uematsu et al. | | |

(Continued)

FOREIGN PATENT DOCUMENTS

| CN | 1699034 A | 11/2005 |
|---|---|---|
| CN | 101325920 A | 12/2008 |

(Continued)

OTHER PUBLICATIONS

Japanese Decision to Grant a Patent dated Nov. 5, 2019, for Japanese Patent Application No. 2017248088.

(Continued)

*Primary Examiner* — Adam D Rogers
(74) *Attorney, Agent, or Firm* — Karceski IP Law, PLLC

(57) ABSTRACT

A robot includes at least one cover member disposed on outside in a direction of an axis of a second wrist unit that rotatably supports a tip-most first wrist unit, to which a tool is fixed, around a predetermined axis. The cover member includes a recessed part obtained by recessing at least a part of an outer peripheral edge around the axis in the direction of the axis. A fastener is provided to fix a plate that holds a linear-shaped item in a direction along the axis between the recessed part and the fastener.

7 Claims, 7 Drawing Sheets

(56) References Cited

U.S. PATENT DOCUMENTS

| | | |
|---|---|---|
| 2005/0281660 A1 | 12/2005 | Nihei et al. |
| 2006/0101937 A1* | 5/2006 | Salomonsson ......... H02G 11/00 74/490.02 |
| 2007/0151391 A1 | 7/2007 | Larkin et al. |
| 2008/0056859 A1 | 3/2008 | Inoue et al. |
| 2013/0098190 A1 | 4/2013 | Pan |
| 2015/0027261 A1 | 1/2015 | Okahisa et al. |
| 2015/0027262 A1 | 1/2015 | Okahisa et al. |
| 2016/0052130 A1 | 2/2016 | Ekas |
| 2016/0297081 A1 | 10/2016 | Watanabe et al. |
| 2017/0334076 A1 | 11/2017 | Bordegnoni et al. |

FOREIGN PATENT DOCUMENTS

| | | | |
|---|---|---|---|
| CN | 103056877 A | 4/2013 | |
| CN | 104440949 A | 3/2015 | |
| CN | 205928627 U | 2/2017 | |
| CN | 106573374 A | 4/2017 | |
| CN | 107443363 A | 12/2017 | |
| EP | 0891842 A1 | 1/1999 | |
| EP | 1352721 A1 | 10/2003 | |
| EP | 1598154 A1 | 11/2005 | |
| EP | 1892064 A1 | 2/2008 | |
| EP | 2829368 A2 | 1/2015 | |
| EP | 2829369 A2 | 1/2015 | |
| EP | 3246136 A1 | 11/2017 | |
| JP | S50125096 U | 10/1975 | |
| JP | S63015616 | * 2/1988 | |
| JP | S63015616 Y2 | 2/1988 | |
| JP | S63015646 U | 2/1988 | |
| JP | H02269593 A | 11/1990 | |
| JP | 10175188 A | 6/1998 | |
| JP | 2000210888 A | 8/2000 | |
| JP | 2003305683 A | 10/2003 | |
| JP | 2004243502 A | 9/2004 | |
| JP | 2006007409 A | 1/2006 | |
| JP | 2008073833 A | 4/2008 | |
| JP | 2014046443 A | 3/2014 | |
| JP | 2015024473 A | 2/2015 | |
| JP | 2015058514 A | 3/2015 | |
| JP | 2015104764 A | 6/2015 | |
| JP | 2016198849 A | 12/2016 | |
| WO | 2007120329 A2 | 10/2007 | |
| WO | 2016033101 A1 | 3/2016 | |
| WO | WO-2016092627 A1 * | 6/2016 | ............. B25J 19/00 |

OTHER PUBLICATIONS

Japanese Search Report dated Oct. 23, 2019, for Japanese Patent Application No. 2017248088.

Chinese Office Action dated Mar. 24, 2020, for Chinese Patent Application No. 201811553367.0.

* cited by examiner

ROBOT AND LINEAR-SHAPED-ITEM TREATING STRUCTURE THEREOF

CROSS-REFERENCE TO RELATED APPLICATIONS

This application is based on and claims priority to Japanese Patent Application No. 2017-248088, filed on Dec. 25, 2017, the entire content of which is incorporated herein by reference.

FIELD OF THE INVENTION

The present invention relates to a robot and a linear-shaped-item treating structure thereof.

BACKGROUND OF THE INVENTION

In order to supply power or fluid to a tool such as a hand mounted on a wrist tip of a robot, a linear-shaped item such as a cable and a tube is laid on an outer surface of the robot to be outfitted up to the wrist tip of the robot (for example, refer to Japanese Unexamined Patent Application, Publication No. 2015-24473). Generally, the linear-shaped item is fixed to an outer peripheral surface of the robot at a wrist of the robot by a sheet metal for a clamp or the like so as not to get entangled or not to wildly move by motion of the robot.

SUMMARY OF THE INVENTION

An aspect of the present invention is directed to a robot including: at least one cover member disposed on outside in a direction of an axis of a second wrist unit that rotatably supports a tip-most first wrist unit, to which a tool is fixed, around a predetermined axis, wherein the cover member includes a recessed part obtained by recessing at least a part of an outer peripheral edge around the axis in the direction of the axis, and a fastener provided to fix a plate that holds a linear-shaped item in a direction along the axis between the recessed part and the fastener.

Another aspect of the present invention is directed to a linear-shaped-item treating structure of a robot including: a plate disposed so as to hold the linear-shaped item between the plate and the recessed part of the above robot; and a fastening member that fixes the plate by using the fastener of the cover member.

DESCRIPTION OF EMBODIMENT(S) OF THE INVENTION

A robot and a linear-shaped-item treating structure 10 according to an embodiment of the present invention will be hereinafter described with reference to the drawings.

The robot according to this embodiment may be a robot having an arbitrary axis constitution. The robot includes, for example, a wrist 1 three-dimensionally movable with respect to a base fixed to a floor surface by three joint axes, in a case of a six-axis articulated type.

Figure 1:
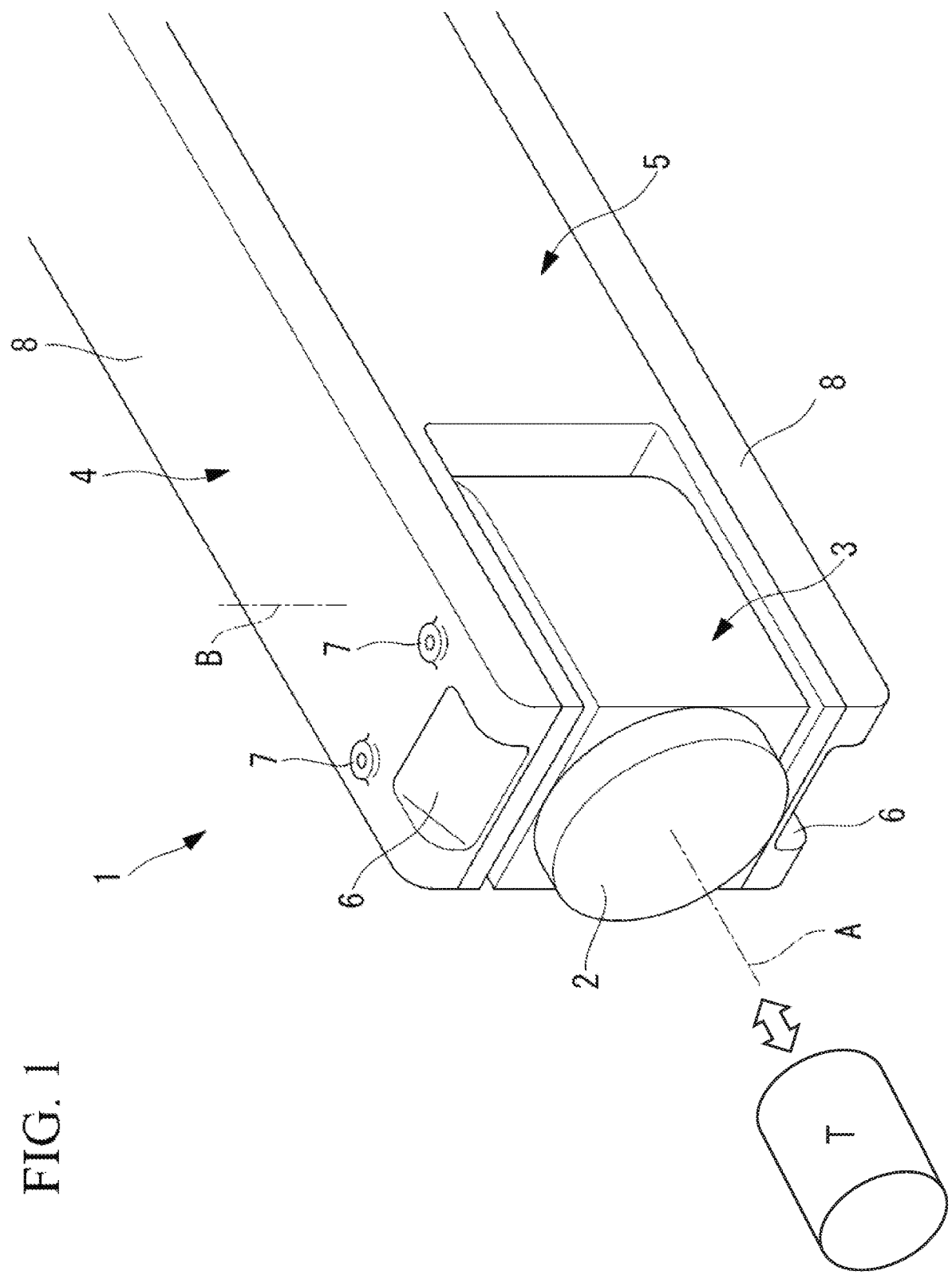
FIG. 1 is a partial perspective view illustrating a robot according to an embodiment of the present invention.

As illustrated in FIG. 1, the wrist 1 of the robot includes a tip-most first wrist unit 3 that rotates a tip member 2, to which a tool T is fixed, around a first axis A, a second wrist unit 4 that rotates the first wrist unit 3 around a second axis (axis) B orthogonal to the first axis (axis) A, and a third wrist unit (not illustrated) that rotates the second wrist unit 4 around a third axis orthogonal to the second axis B. Consequently, the tool T fixed to the tip member 2 can be set to an arbitrary attitude.

As illustrated in FIG. 1, the robot according to this embodiment includes a cover member 8 including recessed parts 6 and taps (fastener) 7 on an outer surface on both ends in the second axis B direction of a housing 5 constituting the second wrist unit 4.

The second wrist unit 4 includes a motor and a reducer (not illustrated) housed in the housing 5.

The recessed parts 6 each are a portion obtained by partially recessing a central part in the width direction of a tip edge (outer peripheral edge) of the housing 5, in the second axis B direction. In the example illustrated in FIG. 1, each recessed part 6 is configured by an inclined surface tapered toward the tip.

The taps 7 are machined in two bearing surfaces provided at two portions on both sides in the width direction of each recessed part 6. In the example illustrated in FIG. 1, the taps 7 are formed on a base end side with respect to each recessed part 6.

Figure 2:
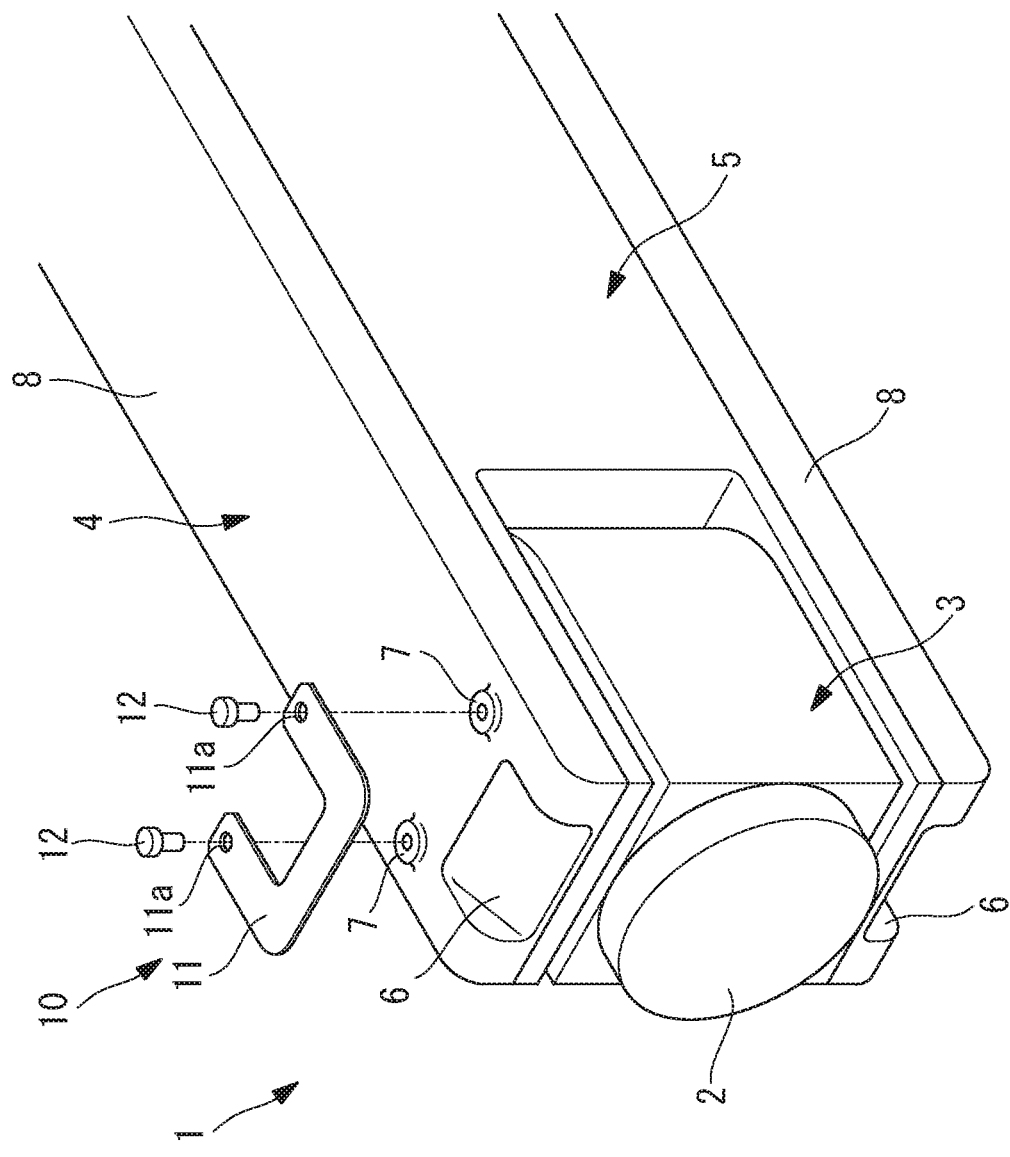
FIG. 2 is an exploded perspective view illustrating a linear-shaped-item treating structure of the robot according to the embodiment of the present invention.

As illustrated in FIG. 2, the linear-shaped-item treating structure 10 according to this embodiment includes the robot of FIG. 1, a plate 11, and bolts (fastening members) 12 fastened to the taps 7. A cable 13 is disposed between the plate 11 and the recessed part 6, the bolts 12 are fastened to the taps 7, so that the plate 11 is fixed to the cover member 8, and the cable 13 is supported.

As illustrated in FIG. 2, the plate 11 is, for example, a metal plate member pressed in a U-shape, and includes two through holes 11*a* that penetrate the bolts 12.

Figure 3:
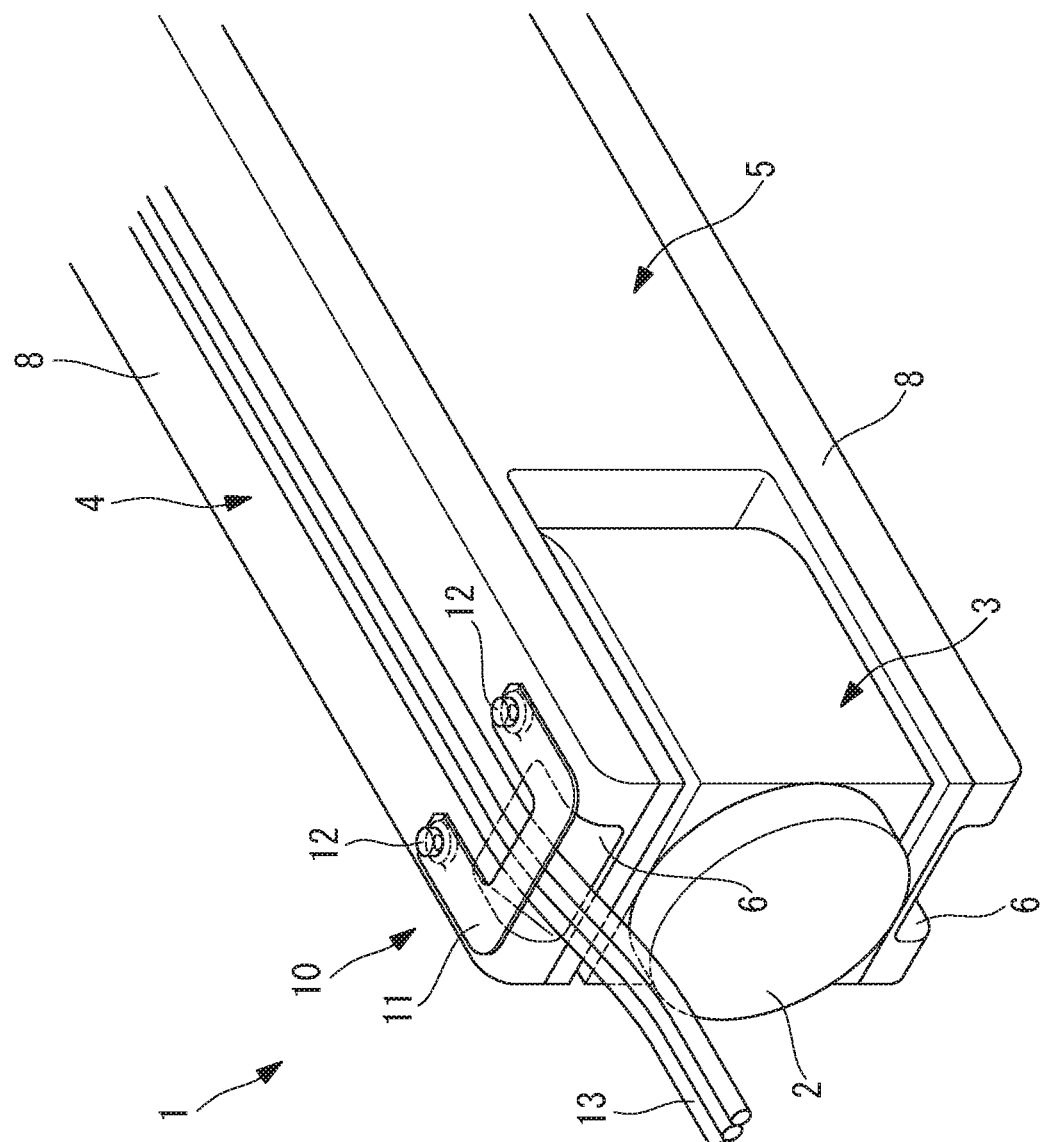
FIG. 3 is a perspective view illustrating a state in which a cable is fixed by the linear-shaped-item treating structure of FIG. 2.

As illustrated in FIG. 3, the bolts 12 are fastened to the taps 7, so that the plate 11 is fixed to the bearing surfaces of the robot, and is disposed so as to block a part of the recessed part 6. In a portion where the recessed part 6 is blocked, the cable (linear-shaped item) 13 is radially held between the plate 11 and the recessed part 6. Additionally, the cable 13 is outfitted so as to extend to the outside and the inside of the recessed part 6 through a portion where the plate 11 is not blocked.

According to the robot and the linear-shaped-item treating structure 10 thereof thus configured according to this embodiment, as illustrated in FIG. 3, the cable 13 that is outfitted so as to be laid on the outside of the robot, and extends from the base end side along an outer surface of the cover member 8 can be fixed so as to pass through the recessed part 6 provided on the tip edge of the cover member 8. Consequently, even when the second wrist unit 4 is activated, and the tool T mounted on the tip member 2 of the first wrist unit 3 is moved, the cable 13 connected to the tool T can be supported so as not to get entangled or so as not to wildly move.

When the cable 13 is fixed, the cable 13 is disposed so as to pass through the recessed part 6, the plate 11 is disposed such that the cable 13 is held between the recessed part 6 and the plate 11, and the plate 11 is fixed to the housing 5 by fastening the bolts 12 to the taps 7.

The recessed part 6 is partially recessed at a center in the width direction of the tip edge, and therefore the cable 13 can be temporarily fixed so as not to fall from the recessed parts 6 in the width direction even before the plate 11 is fixed.

Figure 4:
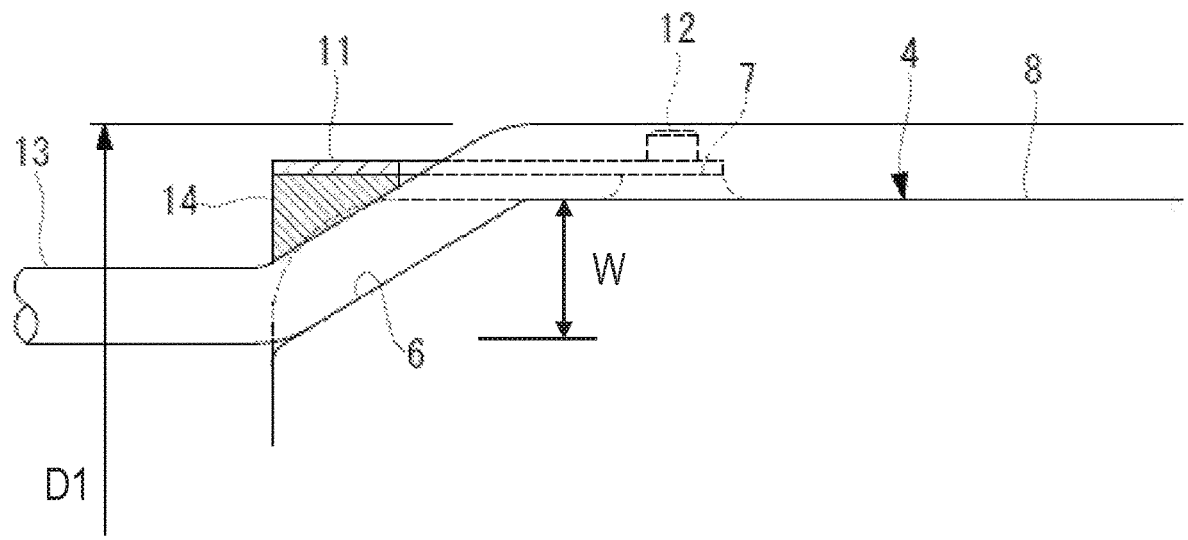
FIG. 4 is a partial enlarged longitudinal sectional view illustrating the state of FIG. 3.

The robot and the linear-shaped-item treating structure 10 thereof according to this embodiment, the dimension D1 in the direction along the second axis B of the second wrist unit 4 after the cable 13 is outfitted is the dimension obtained by addition of the diameter of the cable 13 to the dimension of the housing 5, as illustrated in FIG. 4.

Figure 5:
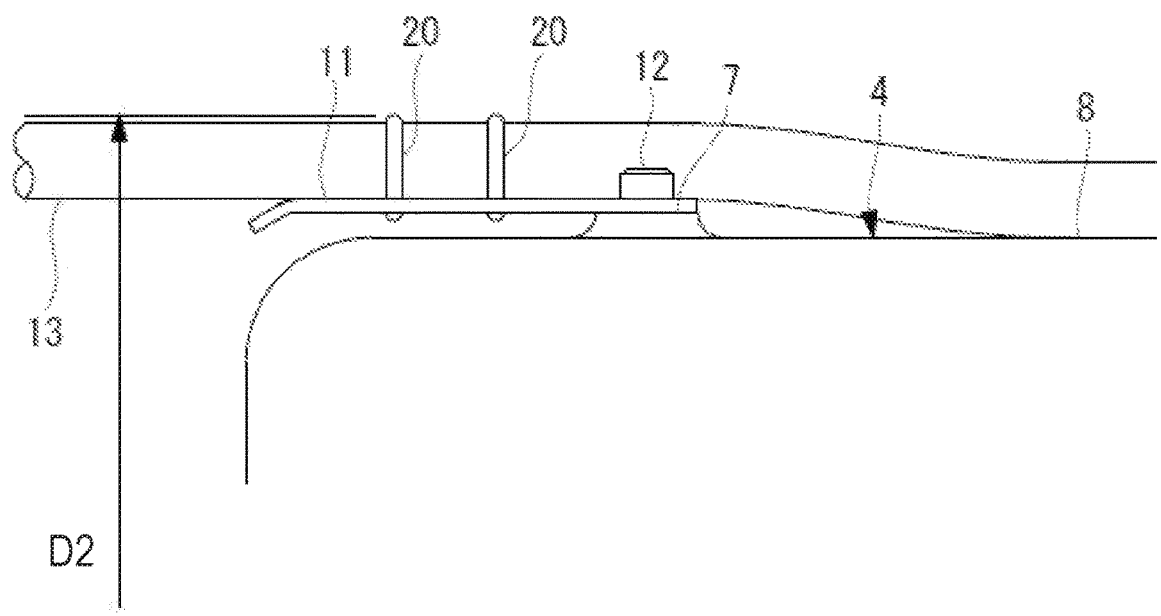
FIG. 5 is an enlarged longitudinal sectional view illustrating a comparative example in a case where no recessed part exists.

On the contrary, in a conventional method of fixing the cable 13 to the plate 11 fixed to the housing 5 by a nylon band 20 or the like, as illustrated in FIG. 5, the dimension D2 in the direction along the second axis B of the second wrist unit 4 after the cable 13 is outfitted is a total of the height dimension of the bearing surface, the thickness dimension of the plate 11 fixed to the bearing surface, the diameter dimension of the cable 13, and the thickness dimension of the nylon band 20. As a result, according to the robot and the linear-shaped-item treating structure 10 according to this embodiment, the dimension in the direction along the second axis B of the second wrist unit 4 including the cable 13 can be largely reduced compared to the conventional method.

That is, even in a case where the tool T fixed to a tip surface of the wrist 1 is inserted into a narrow space along with the wrist 1, this dimension has an advantage that a possibility of interference of the wrist 1 and the cable 13 with a peripheral device can be remarkably reduced.

In this embodiment, the bolts 12 that fix the plate 11 are disposed on the base end side with respect to the portion that suppresses the cable 13. Consequently, as illustrated by broken lines in FIG. 4, head parts of the bolts 12 fastened to the taps 7 can be each disposed at a position lower than the cable 13. As a result, it is possible to prevent increase by the head parts of the bolts 12 of the dimension in the direction along the second axis B of the second wrist unit 4 to which the cable 13 is fixed.

In this embodiment, the plate 11 is fixed such that the cable 13 disposed in the recessed part 6 is held between the recessed part 6 and the plate 11. However, in this case, as illustrated in FIG. 4, an elastic member 14 such as a sponge is compressed between the plate 11 and the cable 13, so that it is possible to more simply fix the cable 13.

Figure 6:
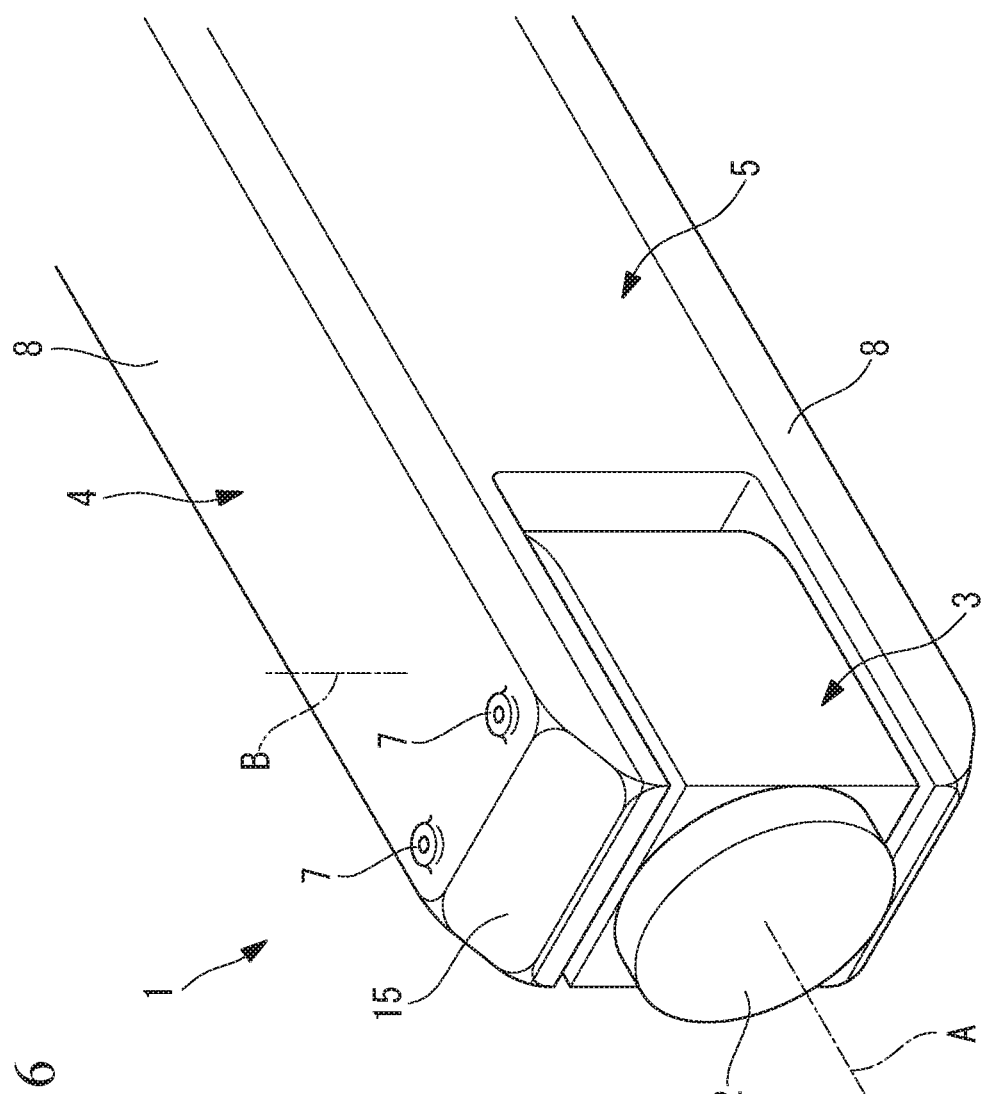
FIG. 6 is a partial perspective view illustrating a modification of the robot of FIG. 1.

In this embodiment, the recessed part 6 is partially provided only at the center in the width direction of the housing 5. However, in place of this, as illustrated in FIG. 6, an inclined surface 15 may be disposed on an overall tip edge of the housing 5. Consequently, it is also possible to reduce the dimension D3 in the direction along the second axis B of the second wrist unit 4 including the cable 13.

The positions of the taps 7 are provided on the base end side with respect to the recessed part 6. However, the taps 7 may be disposed at such positions as to hold the recessed part 6 therebetween in the width direction of the housing 5. Consequently, the shape of the plate 11 that suppresses the cable 13 can be a simple band plate shape. Consequently, there is an advantage that the cable 13 can be more reliably supported.

In this embodiment, the cable 13 is exemplified as the linear-shaped item. However, in place of this, the linear-shaped item may be used in order to fix a linear-shaped item such as a tube which supplies liquid, a wire, or the like to the tool T.

Figure 7:
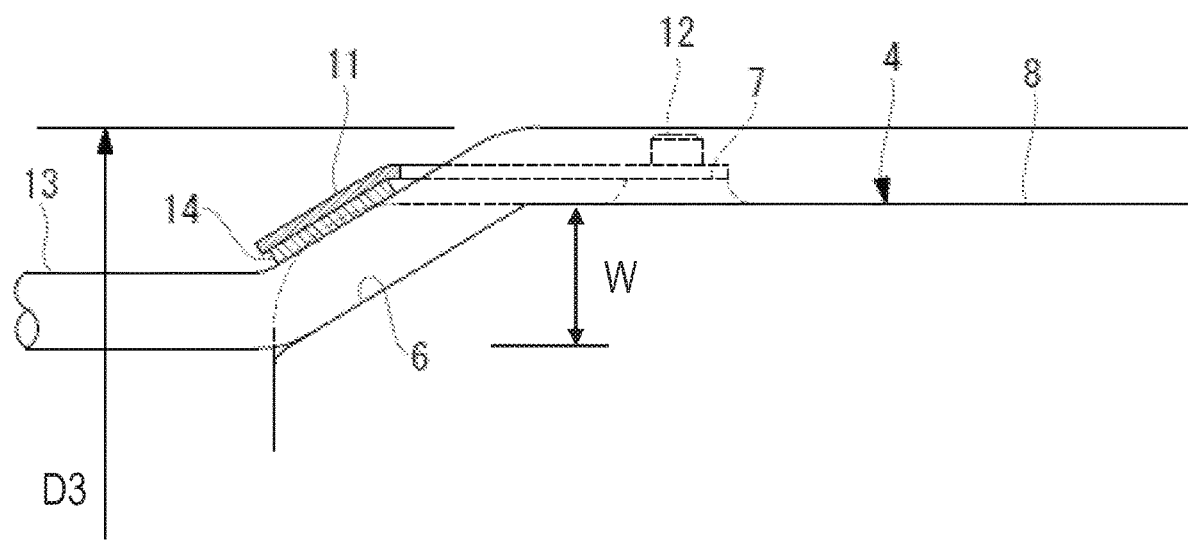
FIG. 7 is a partial enlarged sectional view illustrating a modification of a plate of the linear-shaped-item treating structure of FIG. 2.

As the plate 11, a metal plate member is exemplified. However, in place of this, as illustrated in FIG. 7, a member having a shape curved along an inclined surface of the recessed part 6 may be employed. Consequently, it is possible to further suppress a projection amount in the second axis B direction in the vicinity of the tip of the wrist 1, and further reduce a possibility of interference with a peripheral device.

Figure 8:
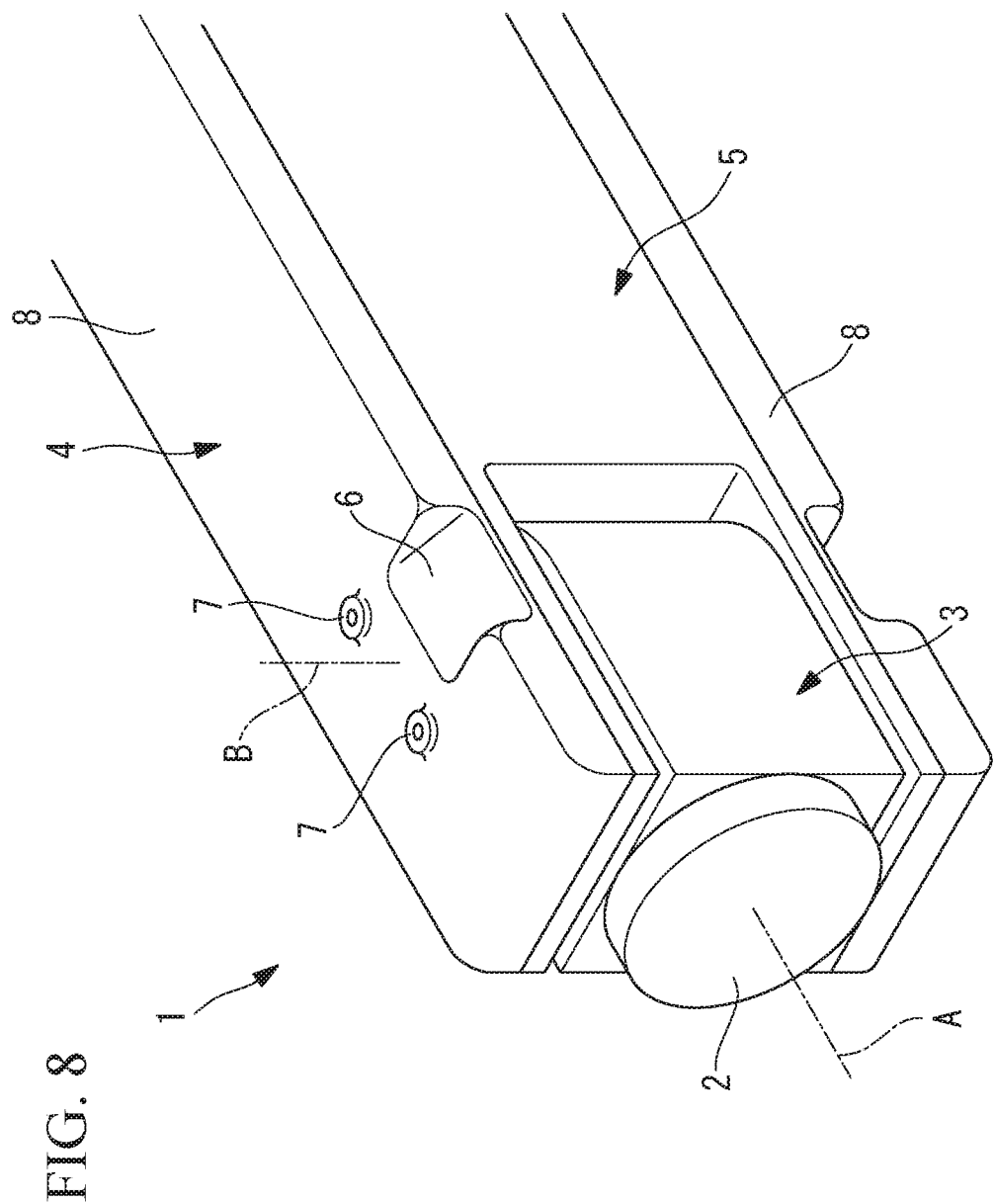
FIG. 8 is a partial perspective view illustrating another modification of the robot of FIG. 1.

In this embodiment, the recessed part 6 is provided in the tip edge of the housing 5. However, as illustrated in FIG. 8, the recessed part 6 may be provided in an edge in the width direction of the housing 5.

The number and the position of the taps 7 may be an arbitrary number and an arbitrary position.

The fasteners are constituted by the taps 7. However, in place of this, the fasteners provided in the cover member 8 is constituted by stud bolts, and nuts may be employed as the fastening members.

As a result, the above-described embodiment leads to the following aspects.

An aspect of the present invention is directed to a robot including: at least one cover member disposed on outside in a direction of an axis of a second wrist unit that rotatably supports a tip-most first wrist unit, to which a tool is fixed, around a predetermined axis, wherein the cover member includes a recessed part obtained by recessing at least a part of an outer peripheral edge around the axis in the direction of the axis, and a fastener provided to fix a plate that holds a linear-shaped item in a direction along the axis between the recessed part and the fastener.

According to this aspect, the linear-shaped item that is wired so as to be laid on the outer surface of the robot passes in the vicinity of the axis of the second wrist unit of the robot, and thereafter is disposed so as to pass through the recessed part provided in at least the part of the cover member at the outer peripheral edge around the axis, the plate is disposed so as to hold the linear-shaped item between the recessed part and the plate, and the plate is fixed to the cover member by using the fastener provided in the cover member, so that the tip side of the linear-shaped item is outfitted so as to extend in the radial direction with respect to the axis of the second wrist unit. Consequently, even when the tip-most first wrist unit, to which the tool connected to the tip of the linear-shaped item is fixed, is rotated around the axis by the second wrist unit, the linear-shaped item can be supported so as not to get entangled or so as not to wildly move.

In this case, in the vicinity of the axis of the second wrist unit, the linear-shaped item projects to the outside in the direction of the axis with respect to the outer surface of the second wrist unit by the thickness of the second wrist unit. However, in the outer peripheral edge of the second wrist unit, the projection amount is reduced by passing of the linear-shaped item through the recessed part of the cover member. Consequently, it is possible to suppress increase of a contour shape of the wrist part by mounting of the linear-shaped item, and reduce a possibility of interference of the wrist part with a peripheral device.

In the above aspect, the recessed part may be provided by partially recessing a part of an outer peripheral edge in a circumferential direction around the axis of the cover member over a predetermined width dimension W.

Thus, on both ends in the circumferential direction of the recessed part obtained by partially recessing the outer peripheral edge, side walls are disposed at such positions as to radially hold the linear-shaped item housed in the recessed part, and therefore the linear-shaped item held between the plate and the recessed part can be simply prevented from being radially deviated.

Another aspect of the present invention is directed to a linear-shaped-item treating structure of a robot including: a plate disposed so as to hold the linear-shaped item between the plate and the recessed part of the above robot; and a fastening member that fixes the plate by using the fastener of the cover member.

According to the present invention, an effect capable of suppressing increase of a contour shape of a wrist part by mounting of a linear-shaped item, and reducing a possibility of interference of the wrist part with a peripheral device is produced.

The invention claimed is:

1. A robot, comprising:
   at least one cover member disposed on an outside of a second wrist unit in a direction of a second axis of the second wrist unit, wherein the second wrist unit rotatably supports a tip-most first wrist unit, wherein a tool is fixable to the first wrist unit, and wherein the tool is rotatable around a first axis orthogonal to the second axis,
   wherein the at least one cover member includes a recessed part obtained by recessing at least a part of an outer peripheral edge around the first axis in the direction of the second axis, and a fastener provided to fix a plate onto the at least one cover member that holds a linear-shaped item in a direction along the second axis between the recessed part and the plate,
   wherein the outer peripheral edge of the at least one cover member defines a tip edge and two edges in a width direction, adjacent to the tip edge, and
   wherein the recessed part is in one of the two edges in the width direction.

2. A linear-shaped-item treating structure of a robot, comprising:
   a plate disposed to hold a linear-shaped item between the plate and a recessed part of a cover member, wherein the cover member is disposed on the outside of a second wrist unit of the robot, wherein the robot comprises a first wrist unit rotatable about a first axis, wherein the first wrist unit is connectable to a tool, wherein the second wrist unit is connected to the first wrist unit, wherein the first wrist unit rotates with respect to the second wrist unit about a second axis, orthogonal to the first axis, and wherein the recessed part is recessed into the cover member in a direction of the second axis; and
   a fastener to fix the plate onto the cover member,
   wherein the cover member defines a tip edge and two edges in a width direction, adjacent to the tip edge, and
   wherein the recessed part is in one of the two edges in the width direction.

3. A robot, comprising:
   a tip-most first wrist unit;
   a tip member connected to the tip-most first wrist unit, wherein the tip member is rotatable about a first axis and wherein a tool is connectible to the tip member;
   a second wrist unit connected to the tip-most first wrist unit, wherein the tip-most first wrist unit is rotatable about a second axis that is orthogonal to the first axis;
   at least one cover member disposed on the second wrist unit, wherein the at least one cover member has a peripheral edge that extends around the first axis and wherein the at least one cover member has a thickness that extends along the second axis;
   a recessed part, wherein the recessed part is formed by recessing at least a part of the thickness of the at least one cover member along the peripheral edge;
   a fastener; and
   a plate fixable to the at least one cover member by the fastener, wherein the plate is fixed to the at least one cover member adjacent to the recessed part, thereby permitting the plate to hold a linear-shaped item between the plate and the recessed part,
   wherein the peripheral edge of the at least one cover member defines a tip edge and two edges in a width direction, adjacent to the tip edge, and
   wherein the recessed part is in one of the two edges in the width direction.

4. The robot according to claim 3, wherein the recessed part has a predetermined width.

5. The robot according to claim 4, wherein the predetermined width extends along a third axis that is orthogonal to both the first axis and the second axis.

6. The robot according to claim 4, wherein the predetermined width extends parallel to the first axis.

7. A linear-shaped-item treating structure of a robot, comprising:
   a plate disposed to hold a linear-shaped item between the plate and a recessed part of a cover member; and
   a fastener to fix the plate onto the cover member,
   wherein the cover member is disposed on the outside of the robot,
   wherein the robot comprises a first wrist unit rotatable about a first axis,
   wherein a tool is connectible to the first wrist unit,
   wherein the robot also comprises a second wrist unit connected to the first wrist unit,
   wherein the first wrist unit rotates with respect to the second wrist unit about a second axis that is orthogonal to the first axis,
   wherein the cover member has a peripheral edge that extends around the first axis,
   wherein the cover member has a thickness that extends along the second axis,
   wherein the recessed part is recessed into the cover member in a direction of the second axis by recessing at least a part of the thickness of the cover member along the peripheral edge,
   wherein the peripheral edge of the cover member defines a tip edge and two edges in a width direction, adjacent to the tip edge, and
   wherein the recessed part is in one of the two edges in the width direction.

* * * * *